Patented Feb. 5, 1924.

1,482,960

UNITED STATES PATENT OFFICE.

FREDERICK C. ALSDORF, OF COLUMBUS, OHIO.

PROCESS OF MANUFACTURING AND LAYING BITUMINOUS SHEET PAVEMENTS AND MATERIALS THEREFOR.

No Drawing.    Application filed September 16, 1922.    Serial No. 588,722.

*To all whom it may concern:*

Be it known that I, FREDERICK C. ALSDORF, a citizen of the United States, and a resident of Columbus, in the county of Franklin and State of Ohio, have invented a new and Improved Process of Manufacturing and Laying Bituminous Sheet Pavements and Materials Therefor, of which the following is a clear, full, and exact description.

This invention relates to a process of manufacturing and laying bituminous sheet pavements and materials therefor, the object of the invention being to provide a process and a composition which enables the pavement to be laid cold and when rolled will form a solid surface measuring up to all requirements of penetration test.

A further object is to provide a material of the character stated, which can be transported from place to place while cold, and which will not form into a solid mass until placed on the pavement and rolled.

Ordinarily in the manufacture and laying of a bituminous road surface, in which rock of a uniform size or a mineral aggregate is combined with the bituminous cementing material, the rock or aggregate and the cement are mixed in proper proportions, each in a heated condition, and are placed, spread and compacted while still hot; or the bituminous cementing material is applied to cold stone or aggregate immediately on the spot where the work is being constructed or after it has been constructed, and either before or after it has been put into the surface. The former method required immediate use of the hot coated stone or aggregate before it has cooled, since on cooling it becomes agglomerated into a mass which cannot be separated and properly manipulated or spread if the original cementing material is of sufficient density or consistency to have a satisfactory cementing capacity.

By my invention, while coating hot or warm stone with hot bituminous cementing material, I avoid the necessity of laying such material before it has cooled by producing it in a form in which each of the coated particles can be readily separated, manipulated, spread and compacted to form a roadway surface, thus enabling the stone or mineral aggregate to be coated with a bituminous cementing material of sufficiently hard consistency at the quarry, crusher, or at a plant suitable for its preparation, and enabling it afterward to be transported for any distance and held for a reasonable length of time before its use without adhesion which will prevent its manipulation.

In the practice of my process I take stone of a character suitable for the construction of a bituminous pavement or a combination of mineral matter of different sizes as an aggregate for this purpose. The stone or mineral aggregate is heated and mixed with a suitable quantity of bituminous cementing medium, also liquefied by heat, the mixture being effected mechanically or by hand or by any suitable machinery.

With my invention instead of transporting this mixture and laying it while it is still hot, I first agitate the mixture while it is cooling and until it is cold, and while it is still warm I add to the mixture a distillate, such for example as petroleum distillate, gasoline, crude oil containing distillate, and the like. This distillate functions to render sticky the surfaces of the particles and to prevent their adhesion before being placed on the road and rolled, I add a filler, such as limestone dust, and the like, which coats the particles sufficiently to prevent the mass from solidifying during transportation and before actual use.

It is to be understood that it is the broad purpose of my invention to provide a pavement in which the material can be readily transported and even stored at the point of use while cold, and without danger of the mixture forming into a solid mass before being placed on the road and rolled. A slight moisture such as rain and the like, will not materially affect the composition.

It is to be understood of course, that the invention is not limited to the particular materials and their proportions which are employed. but to give an example of a composition with suitable proportions which may be used to good advantage, attention is called to the following:

Sand _____ 75% to 85%
Bitumen _____ 9% to 12%
Filler (limestone dust, etc.) __ 6% to 13%

To this composition while still warm, I preferably add a gallon of gasoline to the ton, it being understood that the mixture is being agitated while the gasoline is added, and of course I may use other distillates or similar ingredients without departing from the invention.

If the particles are too sticky it is simply necessary to mix slightly more filler when the composition is cold.

If the mixture is too hot when the distillate is added, it will evaporate, and if too cold, it will not soften the bitumen unless wasteful amounts than necessary are added. Hence I have found that there is a time in the cooling action where best results can be had, for example say between 100° and 150° F. This mixture so treated can be shipped from place to place, piled at the point of use and can be spread cold over the surface and when rolled will form a solid pavement giving all necessary penetration tests to comply with requirements of the particular locality.

After the pavement is formed, it may be found desirable to cover the same with a fine mineral dust to prevent any possibility of a sticky upper surface.

To further improve the composition, I found that after it has become cold and in a granular condition and after having been treated with the distillate as above set forth, that it may be advantageous to pulverize the material while cold and in this pulverized form it can be transported and placed on the road and rolled, the fine particles insuring a strong adhesion to make a perfectly solid pavement.

While I have set forth in detail the composition and the method of using the same, it is to be understood that I do not limit myself to the specific proportions stated.

I claim:

1. The process of manufacturing and laying a bituminous paving material, which consists in agitating a heated mixture of bitumen and a base, and while the mixture is still warm adding a hydrocarbon distillate thereto.

2. The process of manufacturing and laying a bituminous paving material, which consists in mixing heated bitumen with a base, and a filler, agitating the mixture until cold, and while the mixture is still warm adding hydrocarbon distillate thereto.

3. The process of manufacturing and laying a bituminous paving material, which consists in mixing heated bitumen with a base, and a filler, agitating the mixture until cold, and while the mixture is still warm adding a hydrocarbon distillate thereto, then placing the mixture on the road and rolling the same while cold.

4. The process of manufacturing and laying a bituminous paving material, which consists in mixing heated bitumen, sand, and a filler, in substantially the proportions stated, agitating the mixture until cold and adding to the mixture while still warm a hydrocarbon distillate in substantial proportions of one gallon of distillate to the ton of mixture.

5. The process of manufacturing and laying a bituminous paving material, which consists in agitating a heated mixture of bitumen and a base, and while the mixture is still warm adding a hydrocarbon distillate thereto, and finally after the mixture is cold pulverizing the same.

6. The process of manufacturing and laying a bituminous paving material, which consists in mixing heated bitumen with a base, agitating the mixture until cold, and while cold adding a filler throughout the mixture to prevent sticking of the particles while being stored and transported.

FREDERICK C. ALSDORF.